United States Patent [19]

Tan et al.

[11] Patent Number: 5,429,115
[45] Date of Patent: Jul. 4, 1995

[54] HEATER UNIT FOR A SELF-HEATING CONTAINER

[75] Inventors: Phang K. Tan; Ngan T. Goon, both of Singapore, Singapore

[73] Assignee: Effort Holdings Pet, Ltd., Singapore

[21] Appl. No.: 157,167

[22] PCT Filed: Nov. 6, 1992

[86] PCT No.: PCT/GB92/02056

§ 371 Date: Dec. 6, 1993

§ 102(e) Date: Dec. 6, 1993

[87] PCT Pub. No.: WO93/08723

PCT Pub. Date: May 13, 1993

[30] Foreign Application Priority Data

Nov. 8, 1991 [GB] United Kingdom ............... 9123742
Apr. 1, 1992 [GB] United Kingdom ............... 9207121

[51] Int. Cl.[6] ................................................ F24J 1/00
[52] U.S. Cl. ................................ 126/263.01; 126/262
[58] Field of Search .................. 126/263 R, 261, 262, 126/246, 269; 44/504, 506

[56] References Cited

U.S. PATENT DOCUMENTS

| 4,424,798 | 1/1984 | Volk ................................ 126/262 |
| 4,819,612 | 4/1989 | Okamoto et al. .................. 126/263 |
| 4,899,721 | 2/1990 | Tsay ................................ 126/25 B |
| 5,020,509 | 6/1991 | Suzuki et al. .................... 126/262 |
| 5,048,506 | 9/1991 | Hayashi ............................ 126/262 |
| 5,220,908 | 6/1993 | Iizuna et al. ...................... 126/263 |

FOREIGN PATENT DOCUMENTS

| 031523 | 7/1981 | European Pat. Off. |
| 2366820 | 5/1978 | France. |
| 251344 | 10/1947 | Switzerland. |
| 598115 | 2/1948 | United Kingdom. |
| 2158698A | 11/1985 | United Kingdom. |
| WO8300425 | 2/1983 | WIPO. |

*Primary Examiner*—James C. Yeung
*Attorney, Agent, or Firm*—Silverman, Cass & Singer, Ltd.

[57] ABSTRACT

The invention is a heater unit for installation in a disposable self-heating container having a solid fuel tablet, a slidably activated friction-responsive igniter, and a single piece carrier member produced by folding sheet material where the carrier member includes one or more fingers for securing the solid fuel tablet to the carrier member, a sleeve for operatively securing the igniter to the carrier member to enable the igniter to ignite the solid fuel tablet, and tabs securable to the container to facilitate installation of the heater unit therewith.

18 Claims, 4 Drawing Sheets

HEATER UNIT FOR A SELF-HEATING CONTAINER

BACKGROUND OF THE INVENTION

1. Field of the Invention

The present invention relates to a heater unit for use in a self-heating container. In particular it relates to parts for a solid fuel heater unit with a manually operable igniter for automatically igniting the solid fuel. The unit is particularly suitable for use in disposable self-heating food containers, but is not limited to this.

2. Description of the Related Art

A food container with a built-in heater of this type is described in published International patent application WO-A-83/00425.

The heater includes a top heat spreading layer, and a layer of exothermic material having internal walls and arranged on a heat insulating non-combustible layer. Under the non-combustible layer, a slidable striker is positioned in contact with a friction responsive element. A primer material is supported in the non-combustible layer between the friction responsive element and the exothermic material for initiating the exothermic reaction once the primer has been ignited.

Such an arrangement is quite complicated and involves a large number of different parts. In at least some of the embodiments described in WO-A-83/00425, the parts are "stacked" loosely together in the base of the food container, and the design relies on at least a portion of the container itself to hold the heater parts together in the correct position.

SUMMARY OF THE INVENTION

In a first aspect, the present invention provides a heater unit for installation in a disposable self-heating container, the heater unit comprising solid fuel means, slidably activated friction-responsive igniter means, and a single piece carrier member, the carrier member including first means for securing the solid fuel means to the carrier member, second means for operatively securing the igniter means to the carrier member in use to enable the igniter means to ignite the solid fuel means, and third means securable to a said disposable container to facilitate installation of the heater unit.

Such a heater unit uses fewer parts than the prior art, and can be made simple to assemble. The unit is self-contained and does not rely on other parts of the disposable container to hold the solid fuel means and the igniter means in position. The unit can be fully assembled before installation in the container.

The carrier member should preferably be made of a non-combustible material which is able to withstand the heat produced once the burner has been ignited. A suitable material is, for example, tinplate.

Preferably, the first means of the carrier member comprise one or more fingers for fitting over at least a portion of the solid fuel means. The fingers may be hook-shaped. The solid fuel means may have a hole therethrough through which the first means fingers pass. In the preferred embodiment, the solid fuel means comprises an annular solid fuel tablet. The solid fuel may, for example, comprise hexamethylene tetramine, or a mixture of hexamethylene tetramine, silica, sulphur, potassium and calcium.

In the preferred embodiment, the solid fuel burns for approximately 4 to 6 minutes after it has been ignited. It produces heat to heat the container's contents to about 100° C.

Preferably, the igniter means comprises an igniter strip and friction-responsive ignition material, and the second means of the carrier comprises a sleeve in which the igniter strip is slidably retained in contact with the friction-responsive ignition material.

The ignition material may be mounted adjacent to the opposite face of the igniter strip to the solid fuel means. In use, the igniter strip is slidably extracted from the sleeve to cause the ignition to flare, and ignite the solid fuel means.

The ignition material may, for example, comprise a mixture of potassium chlorate, sulphur, gelatine, glass powder, potassium dichromate and carbon black. The material may also include a filler. The igniter strip may include a rough coating for producing frictional heat from contact with the ignition material when the strip is pulled. The coating may comprise a mixture of phosphorus, manganese dioxide, carbon black and antimony sulphide. The coating may also contain a suitable binder such as Latex.

Preferably, the third means comprises one or more tabs for engagement with corresponding slots in a said container.

The carrier member may be formed of any non-combustible material able to withstand the heat that will be produced in use by the fuel tablet once ignited. For example, the carrier may be made of tin plate.

The carrier member may be integrally formed from a sheet of material.

In another aspect, the invention provides a single piece carrier member for use in a heater unit as aforesaid, the carrier member including first means for securing a solid fuel means to the carrier member, second means for operatively securing a slidably activated friction-responsive igniter means to the carrier member in use to enable the igniter means to ignite the solid fuel means, and third means securable to a self-heating container.

In a further aspect, the invention provides a blank intended to be folded to form a carrier member for use in a heater unit as aforesaid.

The invention also extends to cover a self-heating disposable container for food, incorporating a heater unit as aforesaid.

BRIEF DESCRIPTION OF THE DRAWINGS

Embodiments of the invention are now described by way of example with reference to the accompanying drawings, in which.

DESCRIPTION OF THE PREFERRED EMBODIMENTS

Figure 1:
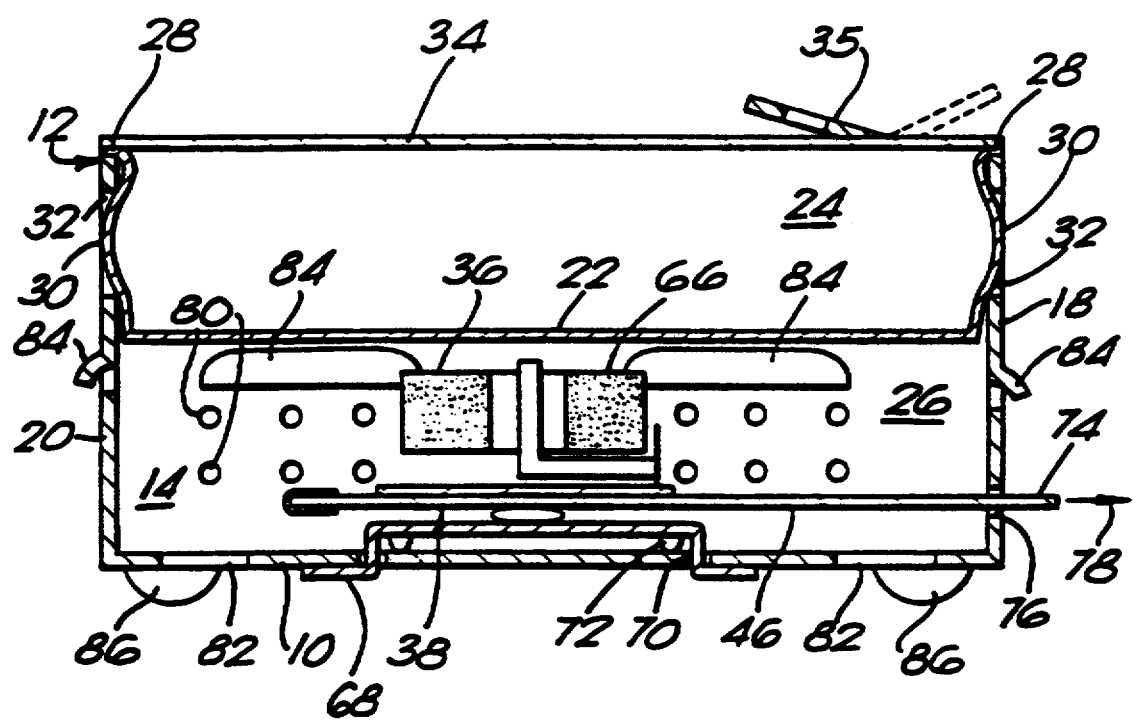
FIG. 1 is a sectional view through a disposable self-heating food container.

Referring to the drawings, a self-heating disposable food pack comprises a substantially rectangular receptacle 12 made of tin-plate. The receptacle has base 10, and a front wall 14, a back wall 16, and end walls 18 and 20, which walls together form the sides of the receptacle. The receptacle contains a partition in the form of a tin-foil tray 22 which divides the receptacle into an upper region 24 for containing food and a lower region 26.

The tray 22 has an outwardly projecting peripheral rim 28 which rests against the upper edges of the sides of the receptacle. The tray is also formed with two pushed-out projections 30 in its walls adjacent the end walls 18 and 20 of the receptacle. The projections 30 engage in openings 32 in the end walls 18 and 20 to positively locate the tray in position, and to prevent the tray from being accidentally removed from the receptacle.

The tray 22 is intended to contain food, and is provided with a peelable lid 34 which is sealed to the tray after the food has been placed inside the tray 22. A pull-ring 35 is provided at one end of the lid 34 to enable the lid to be easily peeled back.

Figure 2:
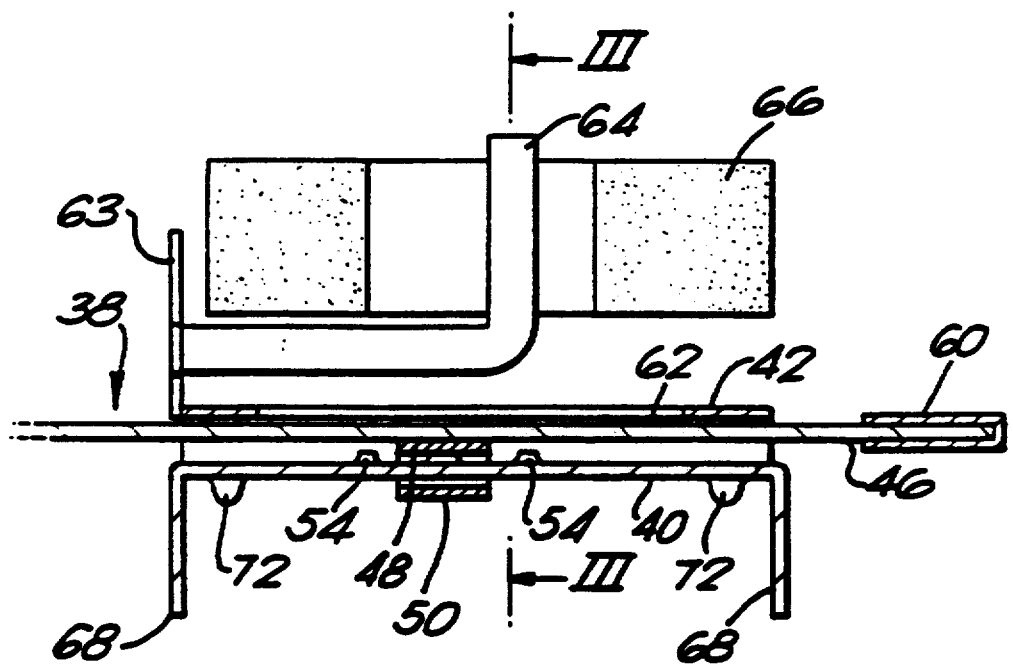
FIG. 2 is a sectional view on an enlarged scale through the heater unit shown in FIG. 1.
Figure 3:
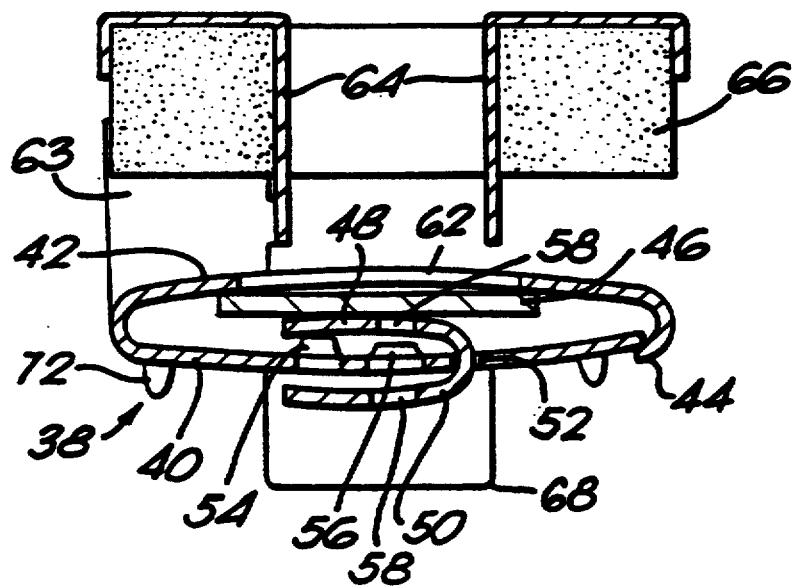
FIG. 3 is a sectional view along the line III—III of FIG. 2.

The lower region of the receptacle 26 contains a heater unit 36 in the form of a solid fuel burner, for generating heat to heat the food in the tray. The heater unit is shown in detail in FIGS. 2 and 3. In these drawings, the thickness of some of the thin parts of the heater unit is exaggerated for the sake of clarity.

The heater unit 36 comprises a single-piece carrier member 38 made of tinplate. The carrier member includes a first base portion 40 integrally joined to a second upper portion 42, the upper portion being folded flat against the base portion 40 to form a narrow sleeve. The upper portion 42 includes a tab 44 along one edge which is bent under the corresponding edge of the base portion 40 to secure the two portions together in the folded condition. A "striker" or igniter strip 46 is slidable through the sleeve, and a friction-responsive ignition head 48 is arranged in contact with the igniter strip. The ignition head 48 comprises a coating of ignition material on a cardboard carrier 50 located in a slot 52 in the base portion 40 to secure the ignition head 48 in position. Three raised-up hollow studs 54 are formed in the base portion 40 and serve to press the ignition head in contact with the underside of the igniter strip and to ensure that the igniter strip will not move accidentally. An additional air supply hole 56 is formed in the base portion 40, in register with corresponding holes 58 formed in the ignition head 48 and carrier 50.

The igniter strip 46 carries at one end a rough surfaced coating 60 for producing frictional heat when the strip is drawn past the ignition head 48. The coating comprises phosphorus, manganese dioxide, carbon black and antimony sulphide mixed with a suitable binder such as latex. The friction-responsive material of the ignition head 48 comprises potassium chlorate, gelatine, potassium dichromate, sulphur, glass powder, carbon black and a filler.

The upper portion 42 of the carrier member includes a square shaped cut-out 62. Supported above the cut-out 62 by integral walls 63 are a pair of L-shaped fingers 64, which serve to secure an annular solid-fuel tablet 66 to the carrier member 38. The fingers 64 pass through the central opening of the annular tablet 66, and are bent over in the shape of hooks to extend in opposite radial directions over the upper surface of the annular tablet 66. The ends of the fingers 64 are folded down against the radially outer surface of the tablet 66.

The solid fuel table 66 comprises hexamethylene tetramine mixed with silica, sulphur, potassium and calcium.

The base-portion 40 of the carrier member 38 includes a pair of outwardly extending tabs 68. In use the tabs 68 are folded so that they engage with slots 70 of the container receptacle 26 to secure the heater unit 36 firmly in position. The base portion 40 of the carrier member 38 also includes four pressed-down feet 72 at the corners of the carrier member. These serve to space the bottom of the carrier unit slightly from the floor of the receptacle, to ensure that air can flow freely to the air supply hole 56 and the hollow studs 54 In the base portion 40 of the carrier member 38.

Once installed in the receptacle 12, one end 74 of the igniter strip 46 is arranged to project through a small slot 76 formed in one end wall 18 of the receptacle 12. In use, to ignite the burner, the end 74 is gripped by hand, and pulled in the direction of the arrow 78, so that the strip is pulled out of the carrier member 38. The frictional heat produced by the movement of the strip 46 against the ignition head 48 causes the ignition material to flare up through the square cut-out 62 in the upper portion 42 of the carrier member 38, to ignite the solid fuel tablet 66. The openings in the hollow studs 54, and the air supply hole 56, ensure that the ignition head 48 receives an ample supply of air so that it will ignite and flare properly. The cut-out 62 in the upper portion 42 allows the flame from the ignition head 48 to spread outside the annular tablet 66 and through its central opening to ensure that the tablet is properly ignited. The L-shaped fingers 64 also serve support the tablet 66 slightly above the base portion 40 of the carrier member to ensure that it too receives ample air to ensure reliable burning.

A number of air-supply holes 80 are formed in thesides of the receptacle 12, and a number of air-supply openings 82 are formed in the base 10, to ensure that the heater unit 36 receives a sufficient supply of air when in use. A number of outwardly projecting louvres 84 are also formed in the sides just below the level of the tray 22, and serve to ventilate the lower region 26 to maintain air circulation. The louvres 84 open downwardly so as to reduce heat wastage.

The holes and openings also provide ventillation to allow the pack to cool after it has been used. With the present embodiment the pack will typically take about 1 minute to cool to a temperature at which the pack can be picked up by bare hands.

The receptacle 12 and the carrier 38 are made of tinplate, and the tray 22 is made of tin-foil, as these are suitable materials able to withstand the heat produced by the burner 36. Four feet 86 are provided at the corners of the base 10. The feet 86 may be of a heat insulating material to protect the surface on which the pack is placed when the food is being heated.

As shown phantom in FIG. 1, it will normally be advisable to peel the lid back a short distance before the burner is ignited. This is to prevent the build up of pressure in the tray which might occur during the heating process.

The pack containing food to be heated may be wrapped in card or plastics packaging material (not shown in the drawings) when it is sold to the consumer.

The packaging may conveniently be used as a surface on which to stand the pack while the food is being heated. A portion of the packaging may be provided to be used as protective insulation for the consumer's hand when the lid 34 is peeled off.

The self-heating disposable pack may be used in a variety of applications for heating or cooking food. One application for which the pack is specifically suitable is for containing pre-cooked food which is sold cold, but which is intended to be re-heated and eaten while hot. For this purpose, the burner is designed to burn for about 4 to 6 minutes after it has been ignited, and to generate sufficient heat to re-heat the food to about 100° C.

Typically, the pack may have a height of about 71 mm, a length of about 161 mm, and a width of about 102 mm. The depth of the tray may be about 30 mm. Thus, it will be appreciated that the pack is not significantly larger than conventional food packs. The outer diameter of the fuel tablet 66 may be about 25 mm, and the inner diameter about 10 mm. The size of the carrier is typically about 40 mm square. The width of the igniter strip may be 24 mm.

Figure 5:
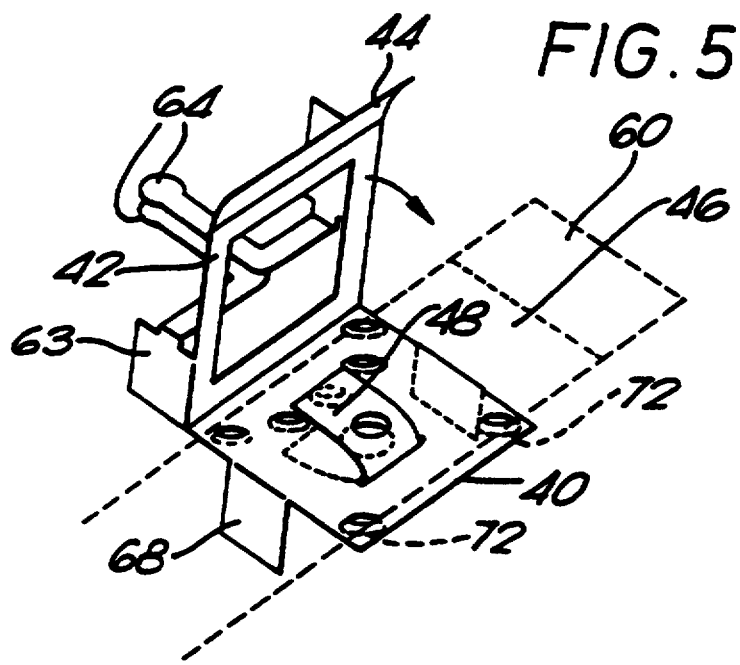
FIG. 5 is a perspective view illustrating how the blank of FIG. 4 is folded to form the carrier member.
Figure 4:
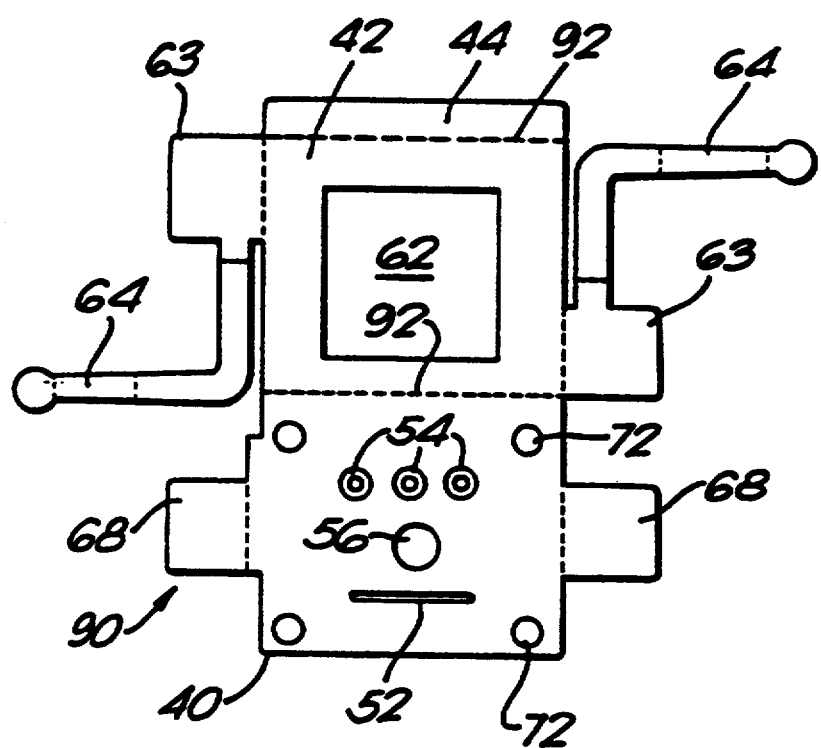
FIG. 4 is a plan view of a blank for forming the carrier member of the heater unit.

FIG. 4 shows a blank 90 for forming the carrier member 38, and FIG. 5 illustrates the blank being folded to form the carrier member 38. The broken lines in FIG. 4 represent lines along which the blank is folded to form the carrier member. The lines 92 may include one or more slots or perforations in the tin plate, since these fold lines are not otherwise accurately positioned. In folding the portions of the blank, the walls 63 are first folded upwardly, and the fingers 64 folded inwardly so that they are parallel with each other. The ignition head 48 and the igniter strip 46 (shown phantom in FIG. 5 for clarity) are laid on the base portion 40 before the upper portion 42 is folded down to form the narrow sleeve.

Figure 6:
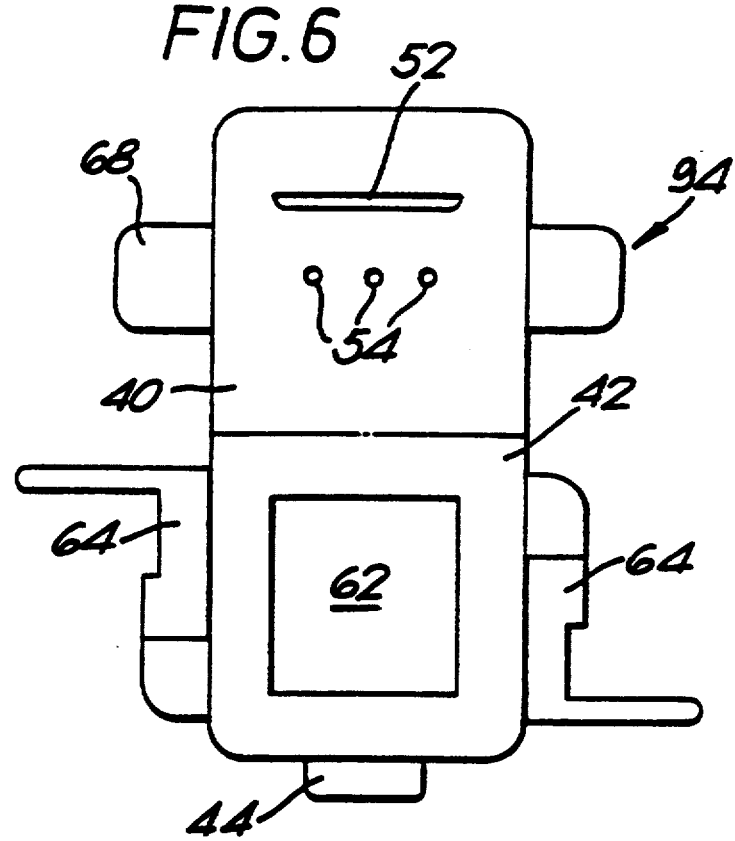
FIG. 6 is a plan view of an alternative blank for forming a carrier member.
Figure 7:
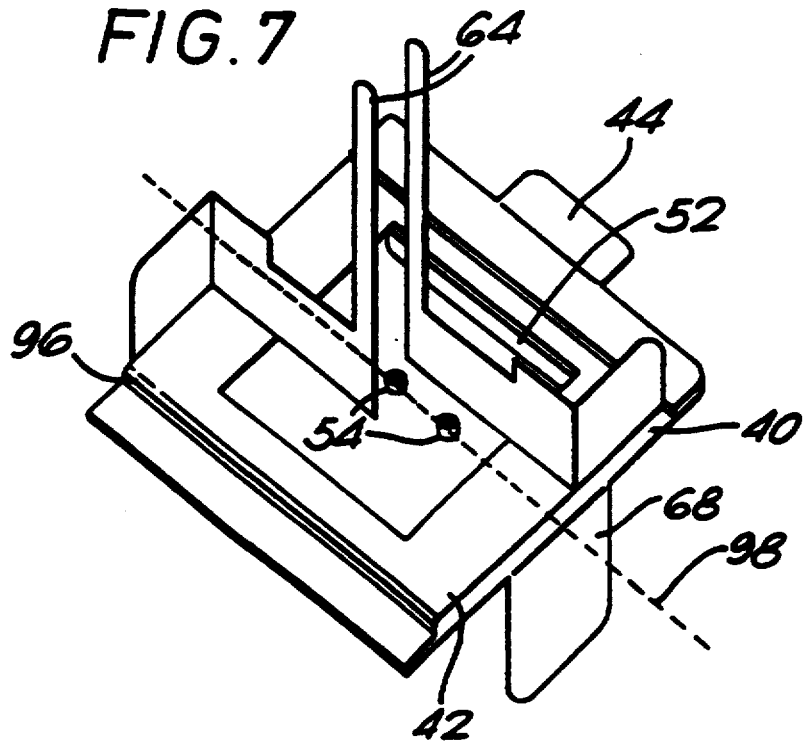
FIG. 7 is perspective view showing the carrier member formed from the blank of FIG. 6.

FIG. 6 shows a slightly modified form of blank 94 for forming a carrier member. This differs from that described above in that the feet 72 and the additional air supply hole 56 of the base portion 40 are omitted. The fingers 64 are slightly shorter such that, in use, they do not extend to reach the radially outer surface of the annular tablet 66. The upper portion 42 is also formed with a raised up step portion 96 to define the region of the sleeve through which the igniter strip is to be slidable (as illustrated by the broken line 98). FIG. 7 illustrates the carrier member formed using the blank 94 of FIG. 6.

It will be appreciated that in the embodiments described above the heater unit is simple to assemble and uses a relatively small number of parts. The heater is self-contained, and does not rely on other parts of the container to hold the igniter strip, ignition head and the solid fuel tablet in their correct positions. The single-piece carrier member formed from a blank enables the heater unit to be manufactured inexpensively, and facilitates its installation in a self-heating container.

It will be appreciated that the present invention has been described above merely by way of example, and that modifications of detail may be made without departing from the scope of the invention.

We claim:

1. A heater unit for installation in a disposable self-heating container, the heater unit comprising solid fuel means, slidably activated friction-responsive igniter means disposed proximate said solid fuel means, and a single piece carrier member having said solid fuel means and said igniter means engaged therewith and produced by folding sheet material to provide first means for securing the solid fuel means to the carrier member, second means for operatively securing the igniter means to the carrier member in use to enable the igniter means to ignite the solid fuel means, and third means securable to said self-heating container to facilitate installation of the heater unit.

2. A heater unit according to claim 1, wherein the carrier member is made of non-combustible material.

3. A heater unit according to claim 2, wherein the carrier member is made of material able to withstand the heat produced by the heater unit once it has been ignited.

4. A heater unit according to claim 1, 2 or 3, wherein the first means of the carrier member comprises one or more fingers for fitting over at least a portion of the solid fuel means.

5. A heater unit according to claim 4, wherein the one or more fingers are hook-shaped.

6. A heater unit according to claim 4, wherein the solid fuel means has a hole therethrough, and the one or more fingers pass through the hole.

7. A heater unit according to claim 1 wherein the solid fuel comprises hexamethylene tetramine.

8. A heater unit according to claim 7, wherein the solid fuel comprises a mixture of hexamethylene tetramine, silica, sulphur, potassium and calcium.

9. A heater according to claim 1, wherein the igniter means comprises an igniter strip and a friction responsive ignition material, the second means comprising a sleeve in which the igniter strip is slidably retained in contact with the friction responsive ignition material.

10. A heater unit according to claim 9, wherein the ignition material is mounted below the igniter strip, and the solid fuel means is mounted above the igniter strip, in use, the igniter strip being slidably extractable from the sleeve so as to cause the ignition material to flare and ignite the solid fuel means.

11. A heater unit according to claim 9 or 10, wherein the ignition material comprises a mixture of sulphur, potassium chlorate, gelatine, potassium dichromate, glass powder, and carbon black.

12. A heater unit according to claim 9 or 10, wherein the igniter strip has a rough surface coating comprising phosphorus, manganese dioxide, carbon black and antimony sulphide.

13. A heater unit according to claim 1, wherein the third means comprises one or more tabs for engagement with corresponding slots in said disposable container.

14. A heater unit according to claim 1, wherein the carrier member is made of tin plate.

15. A heater unit according to claim 1, wherein the carrier member is formed integrally from a sheet of material.

16. A heater unit according to claim 1, in which the carrier member is formed from a blank, the blank comprising first and second portions foldable against each other to define a sleeve for retaining an igniter strip, one or more foldable arms for securing a solid fuel means, and one or more foldable tabs for enabling the carrier member to be secured in a disposable container.

17. A heater unit according to claim 1, further comprising means for securing together the first and second portions when in the folded condition.

18. A heater according to claim 1 or 2, wherein the one or more arms are substantially L-shaped.

* * * * *

UNITED STATES PATENT AND TRADEMARK OFFICE
CERTIFICATE OF CORRECTION

PATENT NO. : 5,429,115
DATED : July 4, 1995
INVENTOR(S) : Phang Kwang Tan and Ngan Thye Goon It is certified that error appears in the above-indentified patent and that said Letters Patent is hereby corrected as shown below:

Column 6, line 1,
Change the dependency of claim 17 to depend from claim 16.
Column 6, line 3,
Change the dependency of claim 18 to depend from claims 16 or 17.

Claim 18, line 1, after "heater" insert --unit--.

This certificate supersedes Certificate of Correction issued September 26, 1995.

Signed and Sealed this

Sixteenth Day of April, 1996

BRUCE LEHMAN

Attest:

Attesting Officer

Commissioner of Patents and Trademarks